(12) United States Patent
Mallinson

(10) Patent No.: US 12,038,999 B2
(45) Date of Patent: Jul. 16, 2024

(54) FAST FOURIER TRANSFORMS WITH INCOMPLETE INPUT DATA REPLACEMENT

(71) Applicant: SiliconIntervention Inc., Kelowna (CA)

(72) Inventor: A. Martin Mallinson, Kelowna (CA)

(73) Assignee: SiliconIntervention Inc., Kelowna (CA)

( * ) Notice: Subject to any disclaimer, the term of this patent is extended or adjusted under 35 U.S.C. 154(b) by 120 days.

(21) Appl. No.: 18/080,557

(22) Filed: Dec. 13, 2022

(65) Prior Publication Data

US 2023/0185872 A1    Jun. 15, 2023

Related U.S. Application Data

(60) Provisional application No. 63/288,826, filed on Dec. 13, 2021.

(51) Int. Cl.
*G06F 17/14* (2006.01)
(52) U.S. Cl.
CPC .................................. *G06F 17/142* (2013.01)
(58) Field of Classification Search
CPC .................................................... G06F 17/142
USPC ............................................................ 708/404
See application file for complete search history.

(56) References Cited

U.S. PATENT DOCUMENTS

| | | | | |
|---|---|---|---|---|
| 5,033,019 A | * | 7/1991 | White | G06F 17/142 708/321 |
| 11,210,400 B1 | * | 12/2021 | Wang | G06F 21/577 |
| 2004/0183530 A1 | * | 9/2004 | Butters | G01N 37/005 324/247 |

* cited by examiner

Primary Examiner — Tan V Mai
(74) Attorney, Agent, or Firm — Gard & Kaslow LLP

(57) ABSTRACT

A method for performing a fast Fourier transform. The bin spreading effect of conventional FFT methodology may be removed by a mathematical technique that relies on an incomplete replacement of the input data sequence. In the present approach this replacement is accomplished by a "round robin" method. In this approach no window function is required and the FFT calculation proceeds after each new sample is added round robin fashion to the input sequence. The resulting output bins from the FFT show the signal evolution with time, overlapping as in the known art but by a single sample. The output of a FFT so constructed is not time invariant, but rather there is a rotation present in each output bin when viewed as an analytical signal. This rotation is predictable and hence removeable, but is also exploitable as a means to remove the bin spill over.

6 Claims, 11 Drawing Sheets

FAST FOURIER TRANSFORMS WITH INCOMPLETE INPUT DATA REPLACEMENT

This application claims priority from Provisional Application No. and 63/288,826, filed Dec. 13, 2021, which is incorporated by reference herein in its entirety.

FIELD OF THE INVENTION

The present invention relates generally to signal processing circuits, and more specifically to methods for processing Fourier transforms.

BACKGROUND OF THE INVENTION

The Fourier transform (FT) is a well-known mathematical tool. A Fourier transform converts a signal from its original domain (often time or space) into a representation in the frequency domain and vice versa. The FT operation examines a continuous amplitude signal for an infinite time (or space) correlating the variation over that infinite interval against a given frequency of rotation of a unit vector in phase space. The discrete Fourier transform (DFT) differs from the FT by taking equally spaced discrete samples of the signal over time (or space) and correlating those samples against a set of similarly discrete samples of a rotating unit vector. The DFT necessarily results in a discrete set of possible frequency descriptions clue to the lack of information between samples.

An obvious practical limitation of both the FT and the DFT is that the interval of time (or space) cannot be infinite, which implies that the DFT is operating on a finite set of samples. A fast Fourier transform (FET) thus operates on a finite set of samples over a finite input time interval.

Two phenomena are present in the output of a FFT. First, as is well known, because the samples of the input time domain signal are taken at discrete and separate times, frequencies present above half of the sampling rate create low frequency artifacts; this is known as the Nyquist sampling limitation.

Second, because the FFT operates on a finite time interval of the sampled data, the resolution in frequency cannot be precise. Since the output frequency bins of the FFT are themselves quantized to multiples of the inverse of the sampling interval, a whole number of cycles of a sampled signal, say 10 cycles, in the sampled interval can be resolved precisely but a fractional number of cycles, such as 10.25 cycles, cannot be resolved precisely.

The consequence of this second phenomena is that signals present in the input time domain sample set that have frequencies corresponding to exact multiples of one over the sample time (including the zero multiple, i.e., a DC signal) fall exactly into the output frequency bins, but signals that would mathematically fall between output frequency bins suffer a significant artifact known as "spill over" or "bin spreading," in which the output frequencies fall into not only the closest frequency bin, but into multiple frequency bins near the ideal frequency. Bin spreading is one of the most inconvenient aspects of the well-known FFT methodology.

The first undesirable phenomenon of low frequency artifacts is adequately resolved by use of a low pass filter as is well-known. However, the second phenomenon of bin spreading is only partially mitigated by known techniques.

Bin spreading, or spill over, is a major source of limitation in the use of the FFT methodology. The known mitigation is to taper the signal amplitude as the limits of the sample interval are reached; functions that achieve this are known as "window functions" and are described in more detail below.

The motivation to use a window function comes from the observation that all frequencies that are precisely encoded by the FFT are phase synchronous in the "window," i.e., the sampling interval. A result in "bin 10" means the signal executed exactly 10 cycles in the input data set, whereas a frequency that should create, for example, 10.25 cycles will be observed to not be phase synchronous in the input data set, as 10.25 cycles implies a quarter cycle mismatch between the phase at the time the sampling began to the time the sampling stopped. It is found that the effect of the phase mismatch at the extremities of the sampling interval is mitigated, i.e., has less effect on the final output, if the signal is caused to go to zero at those extremities, as is accomplished by a window function.

However, while window functions mitigate the bin spreading phenomenon, they do not eliminate it. It would be desirable to be able to perform an FFT in a way that bin spreading is not significantly present in the output.

SUMMARY OF THE INVENTION

Described herein is a method for performing a fast Fourier transform in a way that greatly reduces the effect of bin spreading.

One embodiment discloses a computer-implemented method of performing a series of fast Fourier transforms (FFTs) on samples of an input signal, comprising: (a) receiving, by a processor, a new sample of the input signal; (b) storing, in a memory, by the processor, the new sample in an array at a position indicated by a counter P; (c) incrementing, by the processor, the counter P by 1; (d) resetting, by the processor, the counter P to 0 when the counter P exceeds a length of the array; (e) incrementing, by the processor, a counter S by 1, the counter S indicating how many new samples have been stored in the array; (f) determining, by the processor, whether the counter S is less than the predetermined number of new samples; (g) repeating steps (a) through (f) when it is determined that the counter S is less than the predetermined number of new samples; (h) resetting, by the processor, the counter S to 0; (i) running, by the processor, an FFT on the samples stored in the array, thereby generating a plurality of frequency output bins, each output bin containing phase information of real and complex parts of a different frequency component of the input signal; and (j) processing, by the processor, the phase information of the real and complex parts of each different frequency component of the input signal contained in the plurality of frequency output bins, whereby signal data in each of the plurality of frequency output bins is recovered; and (k) repeating steps (a) through (j) until a predetermined number of FFTs have been run.

Another embodiment discloses a non-transitory computer readable storage medium having embodied thereon instructions for causing a computing device to execute a method of performing a series of fast Fourier transforms (FFTs) on samples of an input signal, the method comprising: (a) receiving a new sample of the input signal; (b) storing, in a memory, the new sample in an array at a position indicated by a counter P; (c) incrementing the counter P by 1; (d) resetting the counter P to 0 when the counter P exceeds a length of the array; (e) incrementing a counter S by 1, the counter S indicating how many new samples have been stored in the array; (f) determining whether the counter S is less than the predetermined number of new samples; (g) repeating steps (a) through (f) when it is determined that the counter S is less than the predetermined number of new samples; (h) resetting the counter S to 0; (i) running an FFT on the samples stored in the array, thereby generating a plurality of frequency output bins, each output bin containing phase information of real and complex parts of a different frequency component of the input signal; and (j) processing the phase information of the real and complex parts of each different frequency component of the input signal contained in the plurality of frequency output bins, whereby signal data in each of the plurality of frequency output bins is recovered; and (k) repeating steps (a) through (j) until a predetermined number of FFTs have been run.

DETAILED DESCRIPTION OF THE INVENTION

Figure 1:
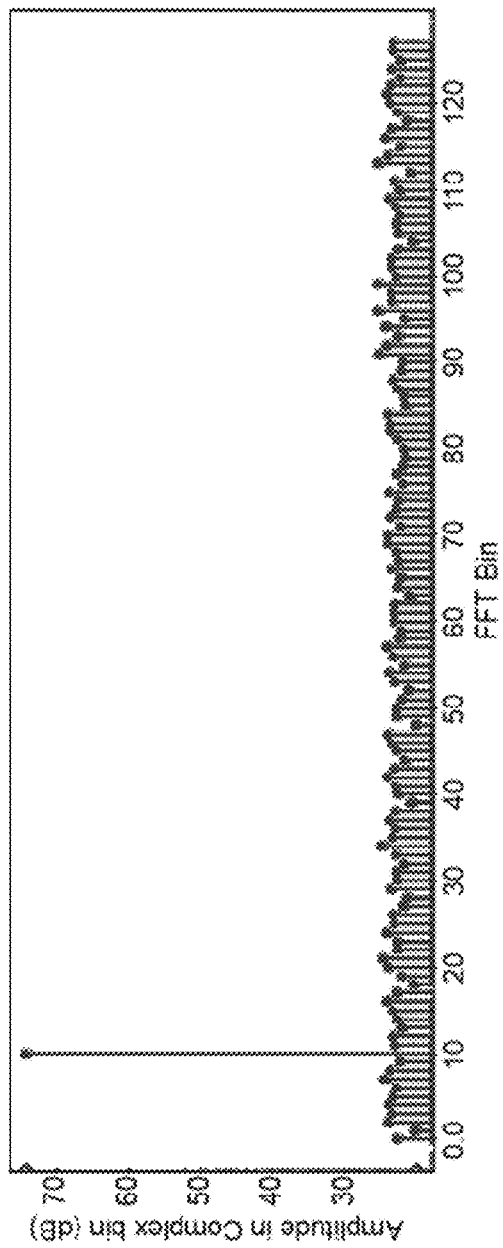
FIG. 1 is a graph of the output of a FFT of a signal of precisely 10 cycles in a time interval of 256 samples as known in the prior art.

Described herein is a method for performing a fast Fourier transform in a way that greatly reduces the effect of bin spreading.

The bin spreading effect of conventional FFT methodology may be removed by a mathematical technique that relies on an incomplete replacement of the input data sequence. In the present approach this replacement is accomplished by a "round robin" method. In this approach no window function is required and the FFT calculation proceeds after each new sample is added round robin fashion to the input sequence. The resulting output bins from the FFT show the signal evolution with time, overlapping as in the known art but by a single sample. The output of a FFT so constructed is not time invariant, but rather there is a rotation present in each output bin when viewed as an analytical signal. This rotation is predictable and hence removeable, but is also exploitable as a means to remove the bin spill over.

In the present approach, a data set is comprised of data samples that are replaced one sample at a time within a sequence of data samples. Unlike the prior art, the new data samples are placed into a set of samples one at a time in a "round robin" fashion at sequential locations by entering new samples into the data set in a sequential order within the series of samples, rather than by inserting new samples at the beginning of a sequence and shifting all of the older samples as is done in conventional digital signal processing.

In conventional FFT processing, a sequence of samples is taken and the FFT run on the set of samples. When a new sample is taken, it is placed at the "front end" of the set of samples, i.e., in the position of the newest sample, and all of the previous samples are shifted over, with the last (oldest) sample dropped from the set.

For example, assume that a FFT is to be run on a set of 256 samples of a signal. An array of 256 samples is created; the entries are often numbered from 0 to 255, with sample 0 being the newest sample and sample 255 being the oldest sample. When a new sample is taken, it is placed in position 0, and all of the previous samples are shifted by one position, so that the sample formerly in position 0 is moved to position 1, the sample formerly in position 1 is moved to position 2, etc. The sample formerly in position 255 is discarded.

Advantages of the present approach may be seen by comparing the results of FFTs according to the prior art to FFTs according to the present approach, and as evident by the examples described herein.

FIG. 1 is a graph of the output of a FFT of a signal of precisely 10 cycles in a time interval, or window, of 256 samples, showing the amplitude of the complex quantity in each FFT bin as known in the prior art. As is common in electronic design, the Y-axis is a logarithmic scale in decibels (dB). The graph of FIG. 1 shows bin 10, corresponding to 10 cycles, having about 74 dB of output, while the remaining bins all have a substantially lower output.

Figure 2:
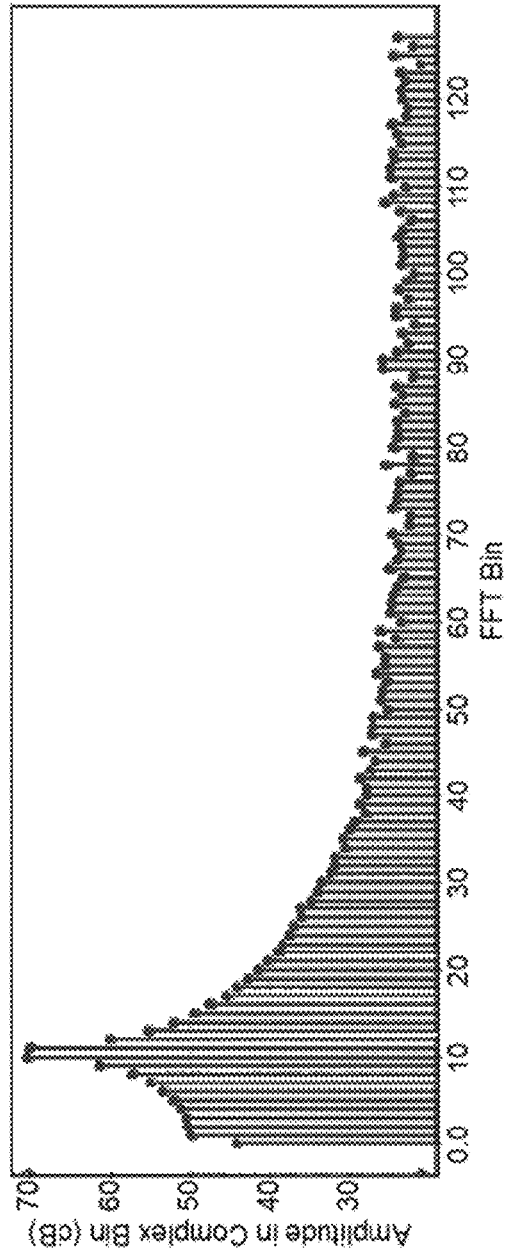
FIG. 2 is a graph of the output of a FFT of a signal of 10.5 cycles in a time interval of 256 samples demonstrating the effect of bin spreading as known in the prior art.

FIG. 2 is a graph of the output of a FFT of a signal of 10.5 cycles in a time interval of 256 samples as known in the prior art, demonstrating the effect of bin spreading described above. As is known in the art and shown in this figure, energy of the signal, which is midway between the $10^{th}$ and $11^{th}$ bins, does not simply split neatly into those two bins, but rather spreads out into many bins on either side of the $10^{th}$ and $11^{th}$ bins.

The consequence of the bin spreading effect is that the precise frequency, i.e., 10.5 cycles in the 256 samples in this case, cannot be easily determined, since an analysis of all the nearby bins is required to do so. Such an analysis would be further complicated if there are multiple input frequencies.

Figure 3:
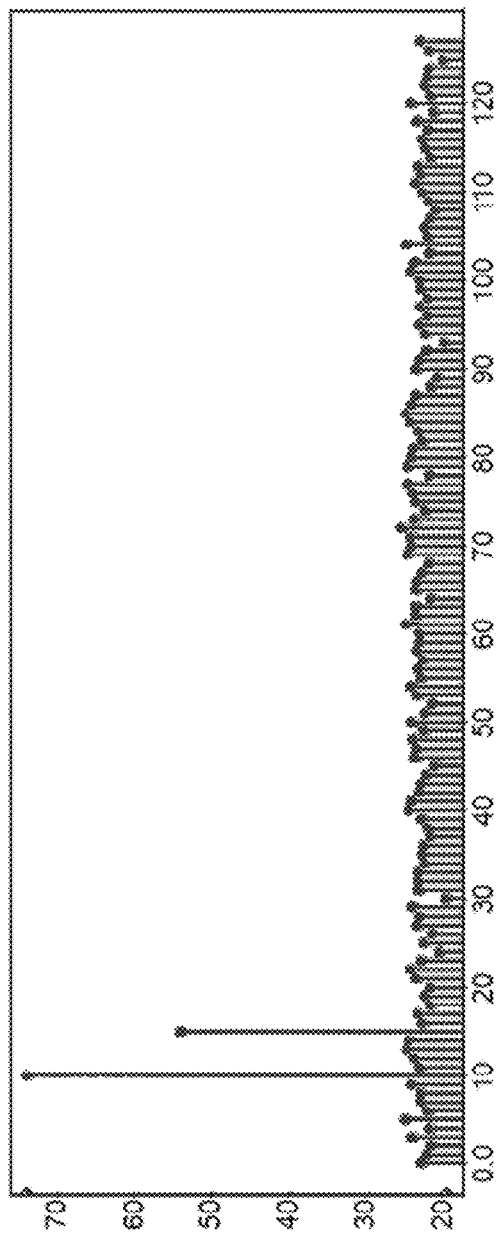
FIG. 3 is a graph of the output of a FFT of a signal consisting of two separate tones at 10 cycles and 15 cycles in a time interval of 256 samples as known in the prior art.

FIG. 3 is a graph of the output of a FFT of a signal consisting of two separate tones, one at 10 cycles and one at 15 cycles at a lower amplitude, in a time interval of 256 samples as known in the prior art. As expected, the graph of FIG. 3 indicates that there are two components to the signal, a peak at 10 cycles and a lower peak at 15 cycles.

Figure 4:
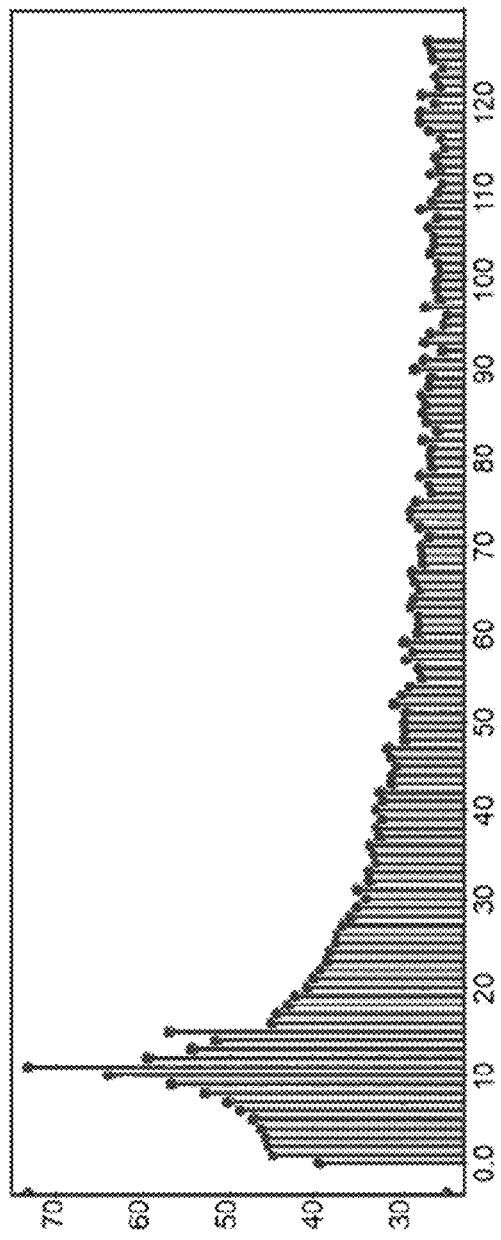
FIG. 4 is a graph of the output of a FFT of a signal consisting of two separate tones at 10.75 cycles and 15.1 cycles, in a time interval of 256 samples as known in the prior art.

FIG. 4 is a graph of the output of a FFT of a signal consisting of two separate tones, one of 10.75 cycles and one of 15.1 cycles, in a time interval of 256 samples as known in the prior art, again demonstrating the bin spreading effect. As shown in the figure, the 15.1 cycle signal can no longer be clearly distinguished due to the bin spreading from the larger 10.75 cycle signal.

Figure 5:
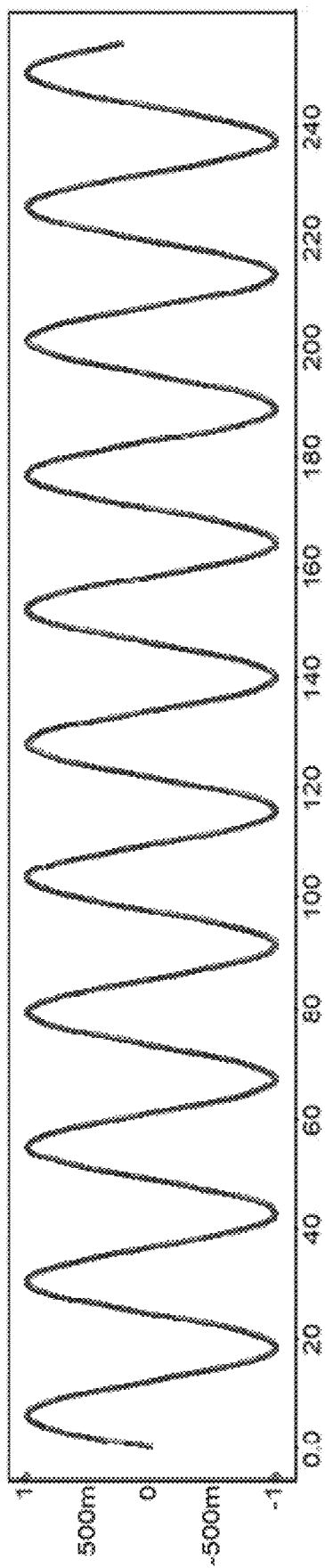
FIG. 5 is a graph of a signal of 10.5 cycles in a time interval of 256 samples as known in the prior art.

As above, window functions are used in the prior art to mitigate the bin spreading problem shown in FIGS. 2 and 4 above. FIG. 5 is a graph of a signal of 10.5 cycles in a time interval of 256 samples as in the example used in FIG. 2 above as known in the prior art. Bin spreading may be explained as being due to the lack of phase coherence at the first and last of the 265 samples in the time interval; because the waveform does not have a number of complete cycles in the 256 samples, the resulting FFT will show bin spreading.

Thus, it is expected that if the lack of phase coherence at the first and last samples were removed, the bin spreading would be less severe. There are a wide variety of window functions known in the art that can be used to shape or reduce the waveform as it nears the two ends of the sampling interval.

Figure 6:
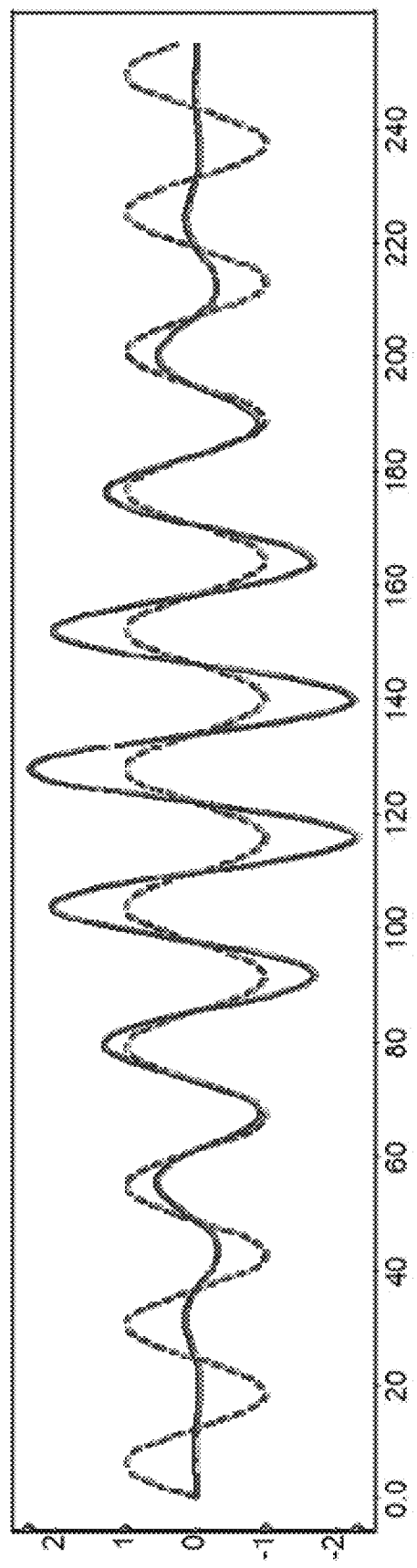
FIG. 6 is a graph of the signal of 10.5 cycles of FIG. 5 and the result of applying a Blackman window to that signal as known in the prior art.

FIG. 6 is a graph of the signal of 10.5 cycles of FIG. 5 and the result of applying a Blackman window to that signal as known in the prior art. The dashed line 602 shows the original waveform of 10.5 cycles, and the solid line 604 shows the waveform as modified by the Blackman window. It will be seen that the window function not only causes the values of the resulting waveform to be zero at the ends of the sampling interval, but also to get smaller closer to the ends of the interval, and at a maximum in the middle of the interval.

Figure 7:
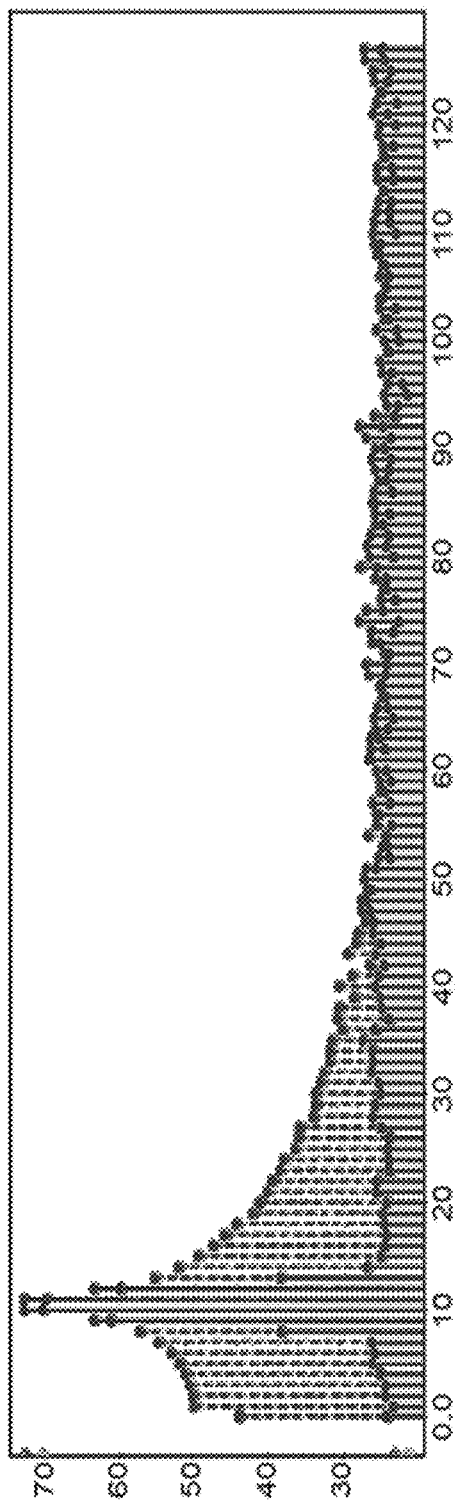
FIG. 7 is a graph of the output of a FFT of a 10.5 cycle signal in a time interval of 256 samples as known in the prior art.

FIG. 7 is a graph of the FFT of the two signals of FIG. 6, the dashed lines 702 showing the FFT of the original waveform of 10.5 cycles, and the solid lines 704 showing the FFT of the waveform as modified by the Blackman window, as known in the prior art. It will be seen that the dashed lines 702 show the same bin spreading as shown in FIG. 2; the result of the window function shown by solid lines 704 has greatly suppressed the bin spreading but has not eliminated it entirely.

Figure 8:
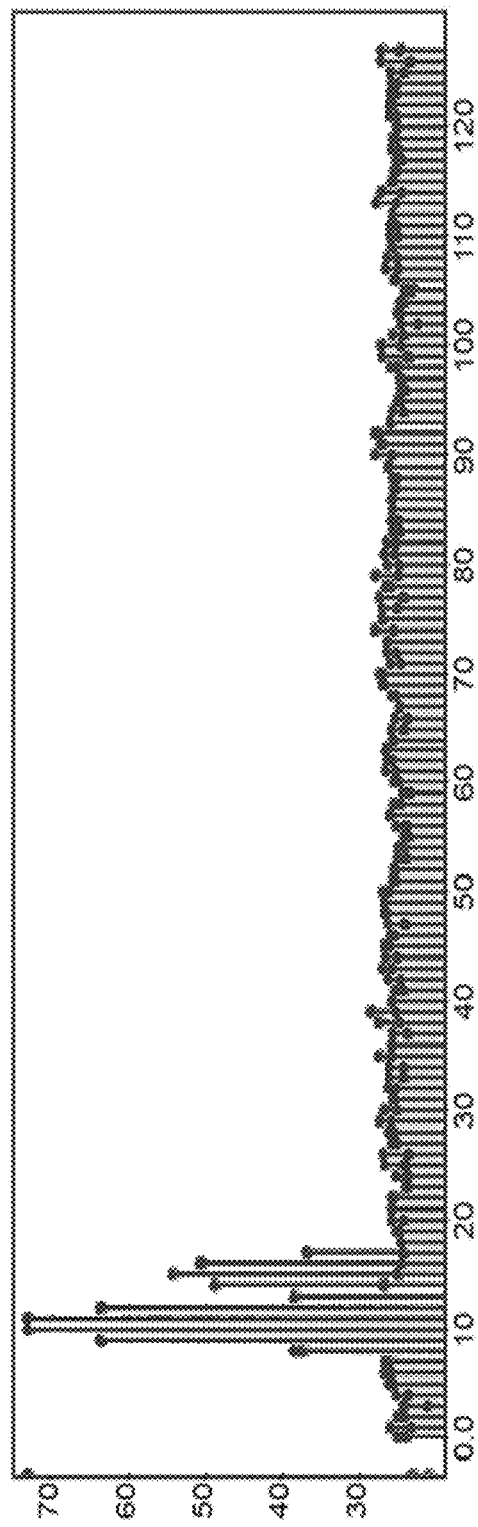
FIG. 8 is a graph of the output of a FFT of the signal of FIG. 4 containing two tones of 10.75 cycles and 15.1 cycles as modified by the Blackman window as known in the prior art.

FIG. 8 is a graph of the FFT of the two signals of 10.75 cycles and 15.1 cycles of FIG. 4 as modified by the Blackman window as known in the prior art. Again it may be seen that the two distinct peaks of the 10.75 cycle tone and the 15.1 cycle tone are more visible than in FIG. 4, in which no window function has been applied, but there is still some bin spreading.

Their ability to reduce bin spreading has made window functions common in FFT systems. However, bin spreading still occurs to a degree that depends upon the phase incoherence at the sampling boundaries, and is still present to some extent in both windowed and non-windowed cases.

In the round robin FFT of the present approach a window function is not necessary or useful; rather, the round robin FFT most easily accommodates a "rectangular" window, i.e., an unmodified window with no window function. Once samples are added to the input data sequence they are not thereafter adjusted; a new sample added, for example, at a given position in the sequence of 256 samples, remains unmodified.

In the conventional non-round robin FFT using a window function, a new sample is first added at the start of the sequence where it is multiplied by a small value from the window. As time passes, that sample moves to the middle of the set of 256 samples where it is multiplied by a large value at the center of the window. Finally, as the sample approaches the end of the data sequence, it is multiplied by a small value again at the end of the window.

The round robin FFT of the present approach is not able to conveniently apply a window function, since to do so every sample would have to change at each step in order to be modified by the window function. However, as is explained below, the round robin FFT can avoid the bin spreading problem altogether because it has a means to separate the "real" signal in any given bin from the spurious signal in the bin caused by any bin spreading of neighboring bins. Thus, the round robin FFT has no need of a window function to separate signals from one another as explained below.

When the conventional non-round robin FFT is sequentially applied to a signal, the output of that FFT depends only on the signal applied at its input, i.e., the FFT itself is time-invariant; each time it is called if the input has not changed, the output will not change. By contrast, the round robin FFT of the present approach is not time-invariant. There is a dependency on the state variable that is the current position of the round robin sampler. Thus, dependent upon where the next input sample will be applied (the state variable of the sampler), the phase in every output bin potentially changes.

On its face, the round robin sampler thus appears to suffer from two problems in comparison to the prior art. First, the round robin sampler cannot conveniently handle a window function. Second, the round robin sampler does not have time-invariance, and the phase of all its output bins will change as the round robin sampler advances. However, as explained below, the phase of the output bin contains information that allows omission of the window function and achieves a useful result.

The output of a FFT is a complex quantity, and the amplitude of that complex quantity shows no time-variance. This means that if the system is concerned only about the amplitude of the signal, then a round robin FFT is no different from a conventional non-round robin FFT, i.e., there is no concern about time-variance, which shows up only in the phase of the complex output quantity.

If the amplitude is not time-variant but the phase is, then the variance must be a rotation of the complex vector present in the output bin; tests show that this is the case. This may be seen in the examples above used to show bin spreading, by repeating the FFT many times to show the evolution of the bin signals.

Figure 9:
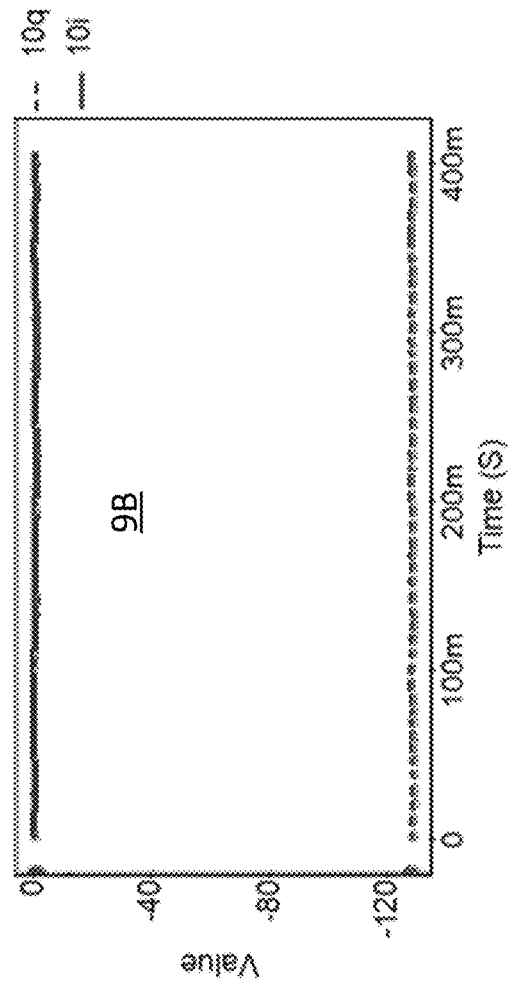
FIG. 9 is a graph showing the result of a round robin FFT for a 10 cycle signal according to the present approach.
Figure 9:
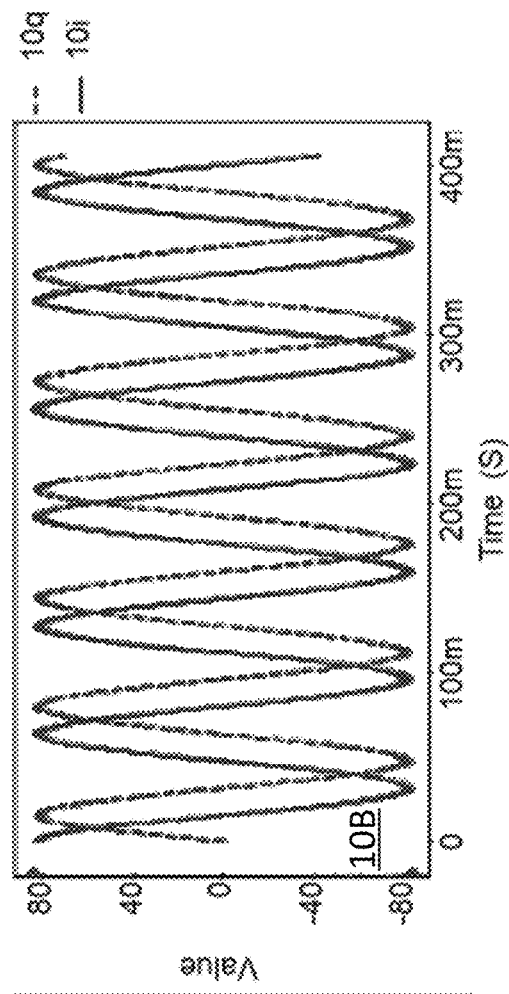

FIG. 9 is a graph showing the result of repeating a round robin FFT over 3000 times for a 10 cycle signal in bin 10, the bin in which the signal is expected. The signal is sampled at a 125 microsecond (μs) sampling interval, i.e., an 8 kilohertz (kHz) sampling rate, using a 256 point FFT. The total sampling time is about 400 milliseconds (ms), i.e., 125 μs times 3000. One version of LISP programming code for performing this FFT is shown in Appendix A.

The graph 9A on the left is the FFT output, i.e., a plot of the amplitude in each bin vs the bin number. As expected and as in FIG. 1 above, bin 10 has a significant signal in it, over 50 dB higher than the other bins. The graph 9B on the right shows the time evolution of bin 10 in both the in-phase (i) or real component of the signal, and the quadrature (q) or complex component of the signal. The phase of the signal in bin 10 is constant over the 400 ms sampling time, with the real component being near 0 and the q component being about −128. Thus, the output signal is a DC signal. Again, this is as expected for a constant 10 cycle signal.

Figure 10:
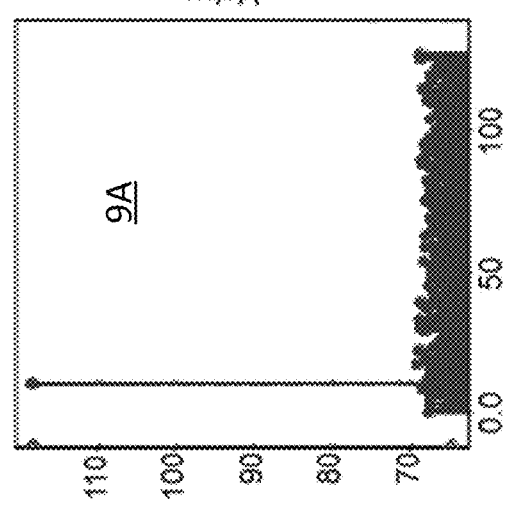
FIG. 10 is a graph showing the result of a round robin FFT for a 10.5 cycle signal according to the present approach.
Figure 10:
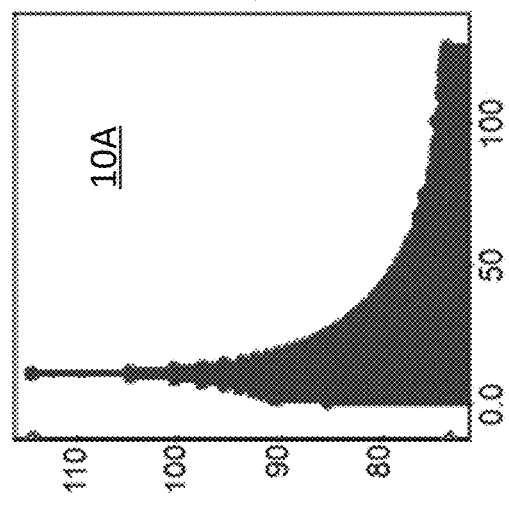

FIG. 10 is a graph showing the result of repeating a round robin FFT over 3000 times for a 10.5 cycle signal in bin 10, again sampled at a 125 microsecond (µs) sampling interval, i.e., an 8 kilohertz (kHz) sampling rate, using a 256 point FFT. The total sampling time is again about 400 milliseconds (ms), i.e., 125 µs times 3000.

The graph 10A on the left again is a plot of the FFT output, the amplitude in each bin vs the bin number. As expected and as in FIG. 2 above, there is significant bin spreading around a peak in bin 10. The graph 10B on the right again shows the time evolution of bin 10 in both the i and q components of the signal.

Now the bin signal is not constant, but rather the phase of the bin signal is changing at a constant rate. Because both the i and q components are changing, a frequency can be described that is both negative and positive depending on the relative phase of i and q. The signal in bin 10 is a rotating vector of fixed amplitude, i.e., the same fixed amplitude that the conventional non-round robin FFT would have, and the frequency present in the bin signal is:

$$f = (F_{bin} - f_{signal}) \cdot \frac{F_{FFT}}{N}$$

where $F_{bin}$ is the frequency of the bin, that is the frequency that should fall into that bin, $f_{signal}$ is the input frequency present at the FFT input to the round robin sampler, $F_{FFT}$ is the rate of repetitions of the FFT and N is the length of the FFT.

In this example:

$F_{bin}=10$ $f_{signal}=10.5$ $F_{FFT}=8$ kHz;

$N=256$

So:

$$f = -0.5 \cdot \frac{8000}{256} \text{ or } -15.625 \text{ Hz}$$

which the graph in the figure confirms.

Figure 11:
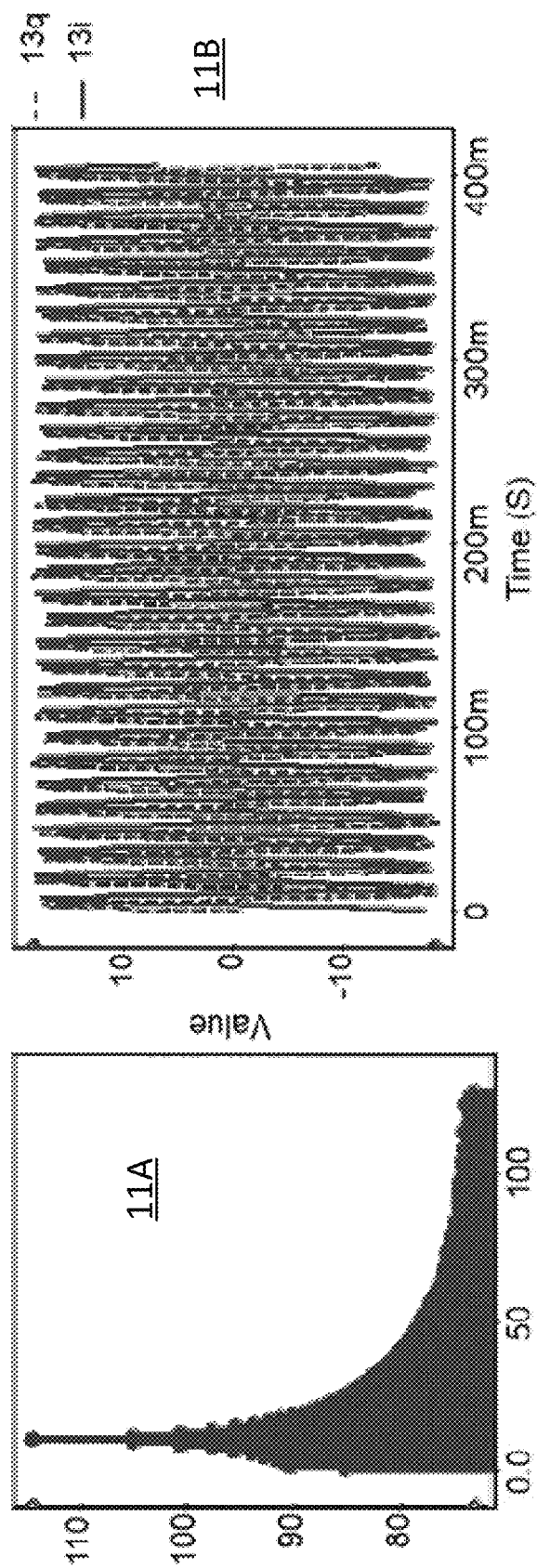
FIG. 11 is another graph showing the result of a round robin FFT for a 10.5 cycle signal according to the present approach.

FIG. 11 is a graph showing the result of repeating a round robin FFT over 3000 times for a 10.5 cycle signal in bin 13 with the same parameters as in FIGS. 9 and 10 above. As expected, and as shown in graph 11A and FIG. 2 above, there is severe bin spreading. Comparing bin 13 to bin 10 in FIG. 10 above, it may be seen that a lower amplitude is present in bin 13 and a different frequency is present than in bin 10. The frequency is as determined by the math above, while the amplitude is that which would be present in the non-round robin if a rectangular window was used. As expected, as the bin gets further away from the bin where we expect the signal (bin 10 in this instance), the spreading of the signal causes an increasing frequency, lower amplitude signal to be present.

The issue thus becomes how to use the phase information present in the round robin FFT output to reduce bin spreading and improve the frequency resolution, i.e., isolate the desired signal(s).

Figure 12:
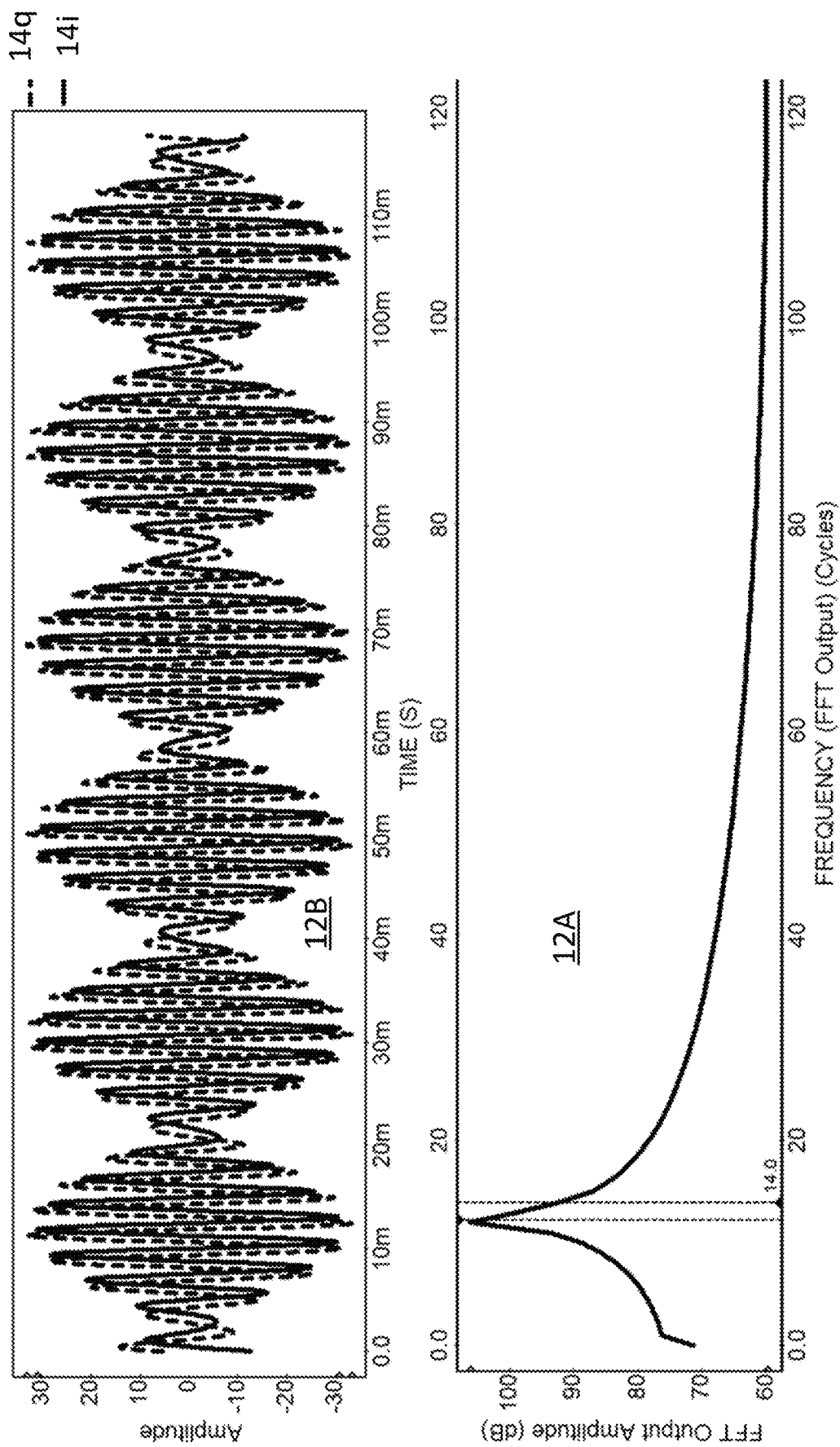
FIG. 12 is a graph showing the result of a conventional FFT for a 14 cycle signal and a 12.3 cycle interference signal according to the prior art.

FIG. 12 is a graph of the output of a conventional FFT for an expected signal of 14 cycles and an undesired, or interfering, signal of 12.3 cycles. The FFT is run about a thousand times, one with a first set of data, a second time with one new signal sample at the front end and the rest of the samples shifted by one location, a third time with a second new signal sample and again the rest of the samples shifted by one location, etc., so that the three FFT outputs overlap.

Graph 12A is a graph of the outputs present in each of 128 frequency bins for a conventional FFT run without a window function, as typically shown in the prior art. Graph 12B is a graph of the real and imaginary parts of the bin 14 signal over time. As expected, there is significant bin spreading; graph 12A shows this bin spreading in the conventional manner, while graph 12B shows a "beating" or mixing of the spill over from the 12.3 cycle signal and the expected 14 cycle signal.

Figure 13:
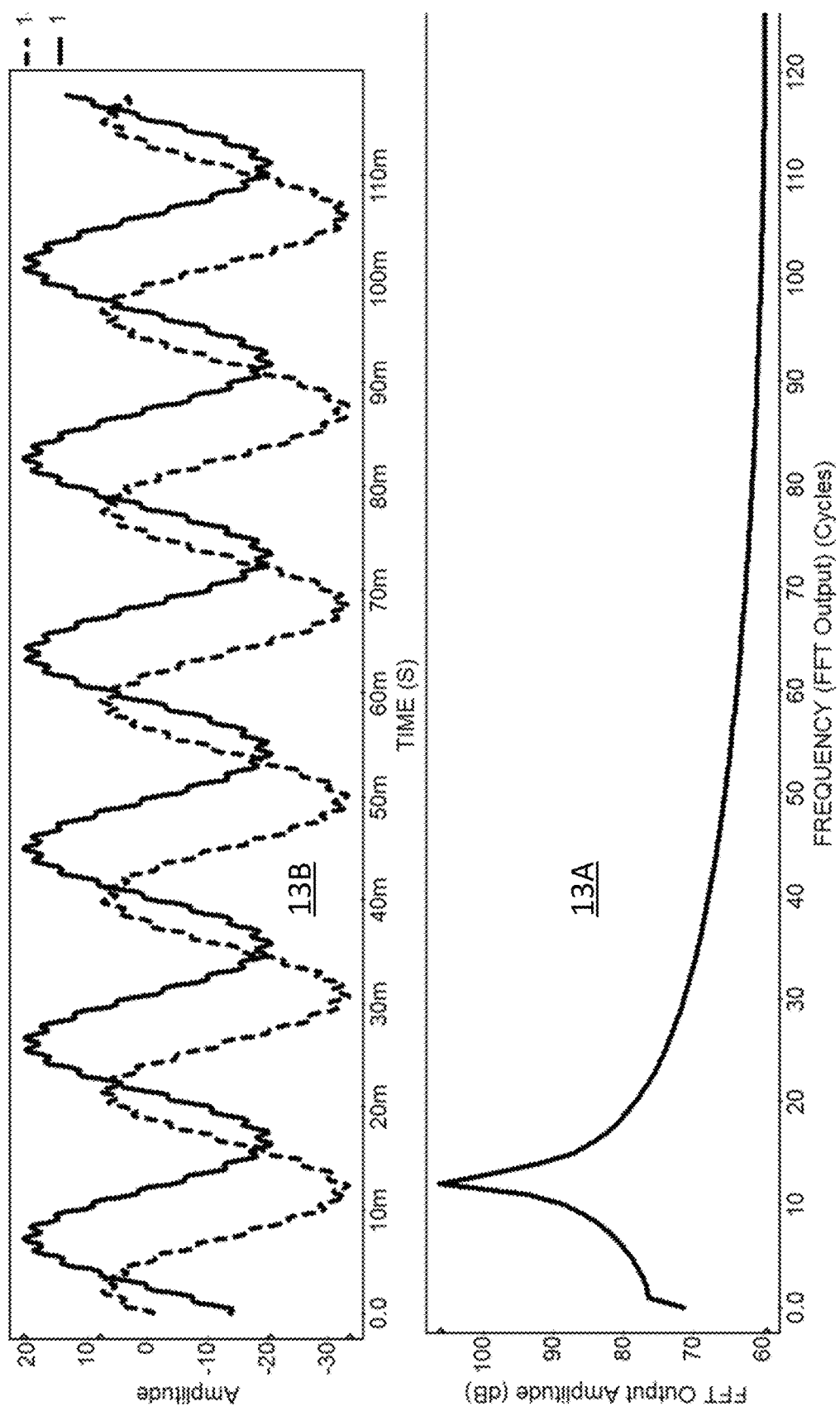
FIG. 13 is a graph showing the result of a round robin FFT for a 14 cycle signal and a 12.3 cycle interference signal according to the present approach

FIG. 13 is a graph of the output of a round robin FFT for an expected signal of 14 cycles and an undesired, or interfering, signal of 12.3 cycles. The FFT is again run about a thousand times, but now the new samples are entered one at a time into sequential location, so that a first new sample is placed in location 0 of a sample array, the next new sample in location 2, etc. Once a $256^{th}$ sample is placed in location 255, the placement of new samples "laps around" in a round robin fashion back to the beginning of the array, so that the $257^{th}$ sample is placed in location 0, the $258^{th}$ sample in location 1, etc.

Graph 13A is a graph of the outputs present in each of 128 frequency bins for a round robin FFT run using the same samples as in FIG. 12, but added to the sample set in the round robin fashion rather than at one end of the sample set as in the prior art. As expected, graph 13A is the same as graph 12A, since the amplitude of the signals in each of the frequency bins is the same using the round robin approach as in the conventional FFT approach, as seen above.

Graph 13B is a graph of the real and imaginary parts of the bin 14 signal over time, but again for the round robin FFT rather than a conventional FFT. In spite of the fact that the output of the round robin FFT still has the same spill over from the 12.3 cycle signal as a conventional FFT in the amplitudes of the frequency bins, the 12.3 cycle signal is not mixing with the 14 cycle signal as in the prior art and seen in graph 12B. Rather, the output of the round robin FFT has created a DC offset between the amplitudes of the real part i and imaginary part q of the bin 14 signal, which are clearly separated, unlike the real and imaginary parts of the bin in the prior art as seen in graph 12B above.

The signal in each output bin of the round robin FFT is an analytic signal. An analytic signal is one that is complex and thus able to distinguish positive and negative frequencies. The FFT transform operates upon analytic signals and the typical use of the FFT with non-analytic signals is thus inefficient; for a non-analytic signal, the complex part of the input quantity is identically zero and a redundant output is created where only half of the resulting sequence has information content, the other half being the complex conjugate.

Appendix B shows LISP programming code for interpreting the output of a FFT when an analytic signal is applied.

The example shows the case of an input at −100 cycles in the 256 data samples. The negative frequency is correctly resolved in the input data.

Figure 14:
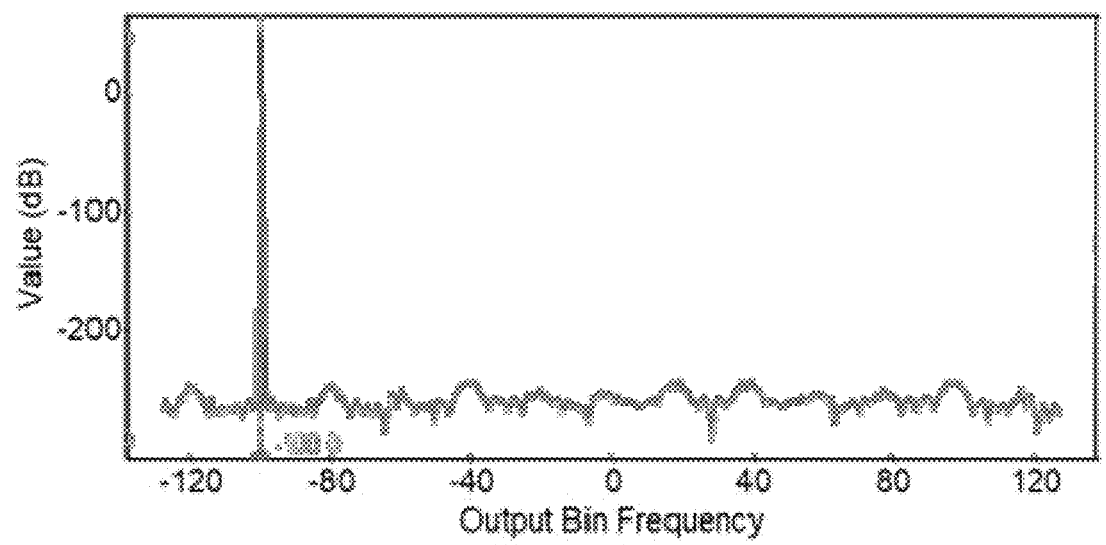
FIG. 14 is a graph of the result of applying the analytic signal generated in a round robin FFT to a succeeding FFT according to the present approach.

FIG. 14 is a graph of the result of applying the analytic signal generated in a round robin FFT to a succeeding FFT. In FIG. 14 the output in bin 13 of a round robin FFT on a signal of 10.5 cycles with 256 samples as shown in FIG. 11 has been processed by a second FFT configured to process an analytic signal.

This alone provides an advantage over the prior art. The output of, for example, a 128 point round robin FFT can be processed by a second 128 point FFT to retrieve the data in the original signal. A conventional FFT of the prior art would require a FFT of 16,384 points (128×128) to achieve the same result.

This fact, that a spill over artifact in any given bin of the output of a round robin FFT may be separated from the ideal signal in the bin by a second complex FFT applied to the bin value, is one advantage of the present approach. This is because the signals that spill over have differing phase rotation rates. Thus, the information is not lost: the artifact of the round robin sampling has introduced a discriminating factor allowing the separation of the spill over signals.

Voice recognition is an application in which FFTs are commonly used. In the general case the complex FFT on the bin signal allows evaluation of the total energy in the spill over signal.

In the prior art, a set of overlapping FFTs is typically used to derive all of the frequency aspects of a speech signal. To determine, for example, a 300 Hz tone starting at a given time and remaining for a certain duration, a set of FFTs might be performed at 50 ms intervals. If these are performed one after each other and the bin representing 300 Hz tracked, the 300 Hz signal would be seen to appear in, for example, the fourth such FFT at time 200 ms, i.e., four 50 ms blocks of data having been passed to the FFT routine. Later, at say the eighth FFT, the 300 Hz signal is no longer present. It may therefore be concluded that the 300 Hz signal existed from time 200 ms to time 400 ms.

Note that the resolution with which the onset and end of the 300 Hz tone can be determined is 50 ms, i.e., the time of each of the FFT operations. This is found to be insufficient and commonly samples of the data are interleaved such that the FFT operations overlap. For example, the first FFT operation might have samples from 0 ms to 50 ms, the second from 25 ms to 75 ms, the third samples from 50 ms to 100 ms. The FFT operations are overlapped and the resolution in time to find the 300 Hz signal is improved from 50 ms to 25 ms.

The ultimate in overlap would be to run the FFT over, for example, 256 samples again every time a new sample is available. This is what the round robin FFT does; a new set of input data is available every time a new input is set in the round robin fashion into the input. No block of data is shifted at all, simply one new value overwrites the one that was present at the position in the input data sequence.

As a practical matter, in some applications a simple low pass filtering of the bin signal will be sufficient to remove the spill over. Consider, for example, the signal of FIG. 8 above, containing both a 10.75 cycle signal and a 15.1 cycle signal. Bin 13 receives spill over from those signals that may greatly outweigh any intended signal at 13 cycles, making any data in a 13 cycle signal unreadable.

However, as above, the round robin FFT will result in phase changes between the real and imaginary parts of the FFT output as seen in FIGS. 10 and 11 above (although FIGS. 10 and 11 are for a different input signal). Those phase changes occur in a given bin at about the difference in the frequency of the input signal(s) from the cycle signal that the particular bin is intended to receive. Thus, in FIG. 8, bin 13 in the FFT output, which contains a 13 cycle frequency component, will show phase changes at about 2.25 cycles, the difference of a 13 cycle signal from the 10.75 cycle input signal, and at about 2.1 cycles, the difference of a 13 cycle signal from the 15.1 cycle input signal.

Thus, a pair of low-pass filters applied to the output of the FFT shown in FIG. 8 above will be sufficient to recover the DC output created by the offset between the real and imaginary outputs and thus recover the signal in bin 13. Such a pair of low-pass filters with a cutoff of, for example, 1 Hz, will thus recover any real data that has been included in the signal at the frequency of bin 13.

Such a pair of filters may be applied to each frequency bin of interest with appropriate band pass characteristics to isolate a desired signal from any spill over. It will be apparent to one of skill in the art that the low-pass filters must allow a signal to pass at a rate greater than the "rate of innovation" (ROI), i.e., the rate at which data in the signal changes, or data may be lost. Appendix C is a LISP programming code listing of one example of how the filtered bin outputs may be generated.

Voice recognition is one application in which only low-pass filtering is needed to obtain the intended data from the output of a FFT. Only the energy in the ideal bin is needed for the signal to be detected. While a typical sample rate might be 32 kHz to 44 kHz to capture music frequencies up to 16 kHz to 22 kHz, respectively, while speech might involve frequencies from 100 Hz to 500 Hz, and a FFT of 256 points employed. The rate of innovation for speech may be quite low, say 100 Hz, as the data in the signal does not change very often.

Figure 15:
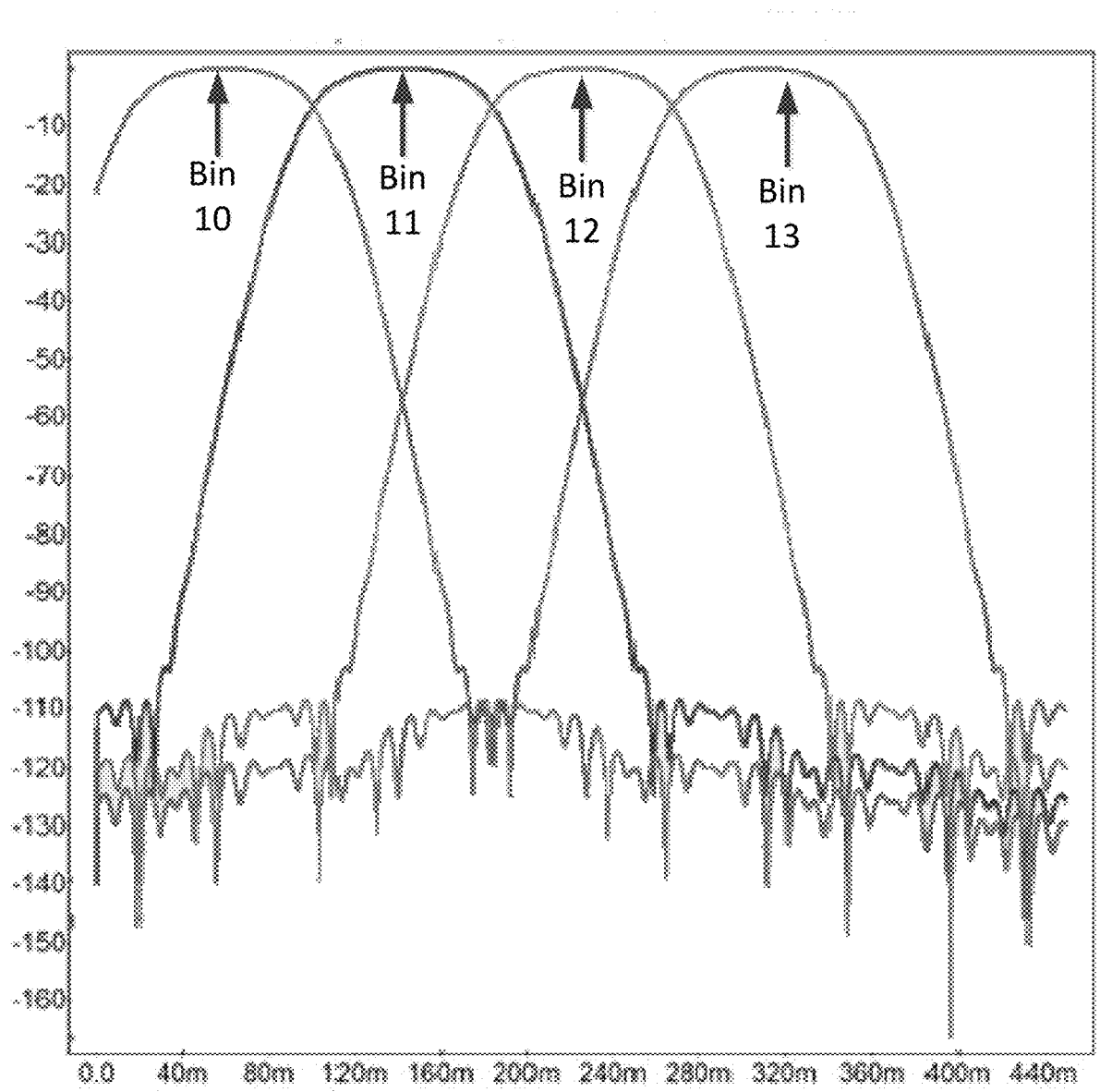
FIG. 15 is a graph of the effect of a low pass filter on the rotating bin signal from a round robin FFT in one embodiment according to the present approach.

FIG. 15 is a graph of the effect of a low pass filter on the rotating bin signal from a round robin FFT in one embodiment according to the present approach. The graph shows the signal in bins 10 through 13 (the y axis in dB) as the input signal (x axis vs time) sweeps past the bin center frequencies. There is a high resolution in the bin signal. For example, as the input frequency reaches the center of bin 11, the spill over signal in bin 10 is suppressed by more than 50 dB.

Since only one sample is changed, all other values remaining constant, it may be assumed that a great deal of the FFT calculation can be avoided: most parts in the calculation have not changed. This is true to some degree, as may be appreciated by considering the structure of a Cooley-Tukey version of the FFT comprising butterfly circuits as is known in the art. The signal flow is such that if one element of the input sequence is changed, that change propagates through the network and affects every output, as is expected, but it is unable to change a large fraction of the nodes.

Suppose a Cooley-Tukey FFT has 16 inputs and 16 outputs. Changing one input only changes two of the first 16 butterfly circuits. The output of that one butterfly circuit is then applied to four of the sixteen butterfly circuits at the second level, eight of the sixteen butterfly circuits at the third level, and all sixteen butterfly circuits at the output.

The same principle will apply to any FFT of length $2^N$. The fraction of the nodes changed per round robin step versus the length of the FFT is:

$$\frac{2^{N+1} - 1}{2^N \cdot (N + 1)}$$

Figure 16:
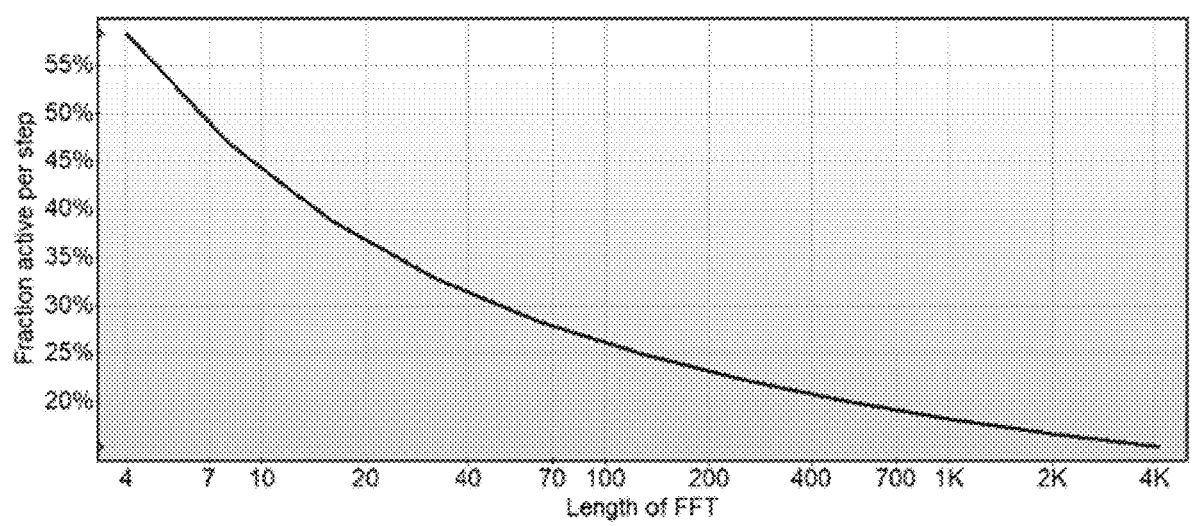
FIG. 16 is a graph of the number of nodes in a round robin FFT that are changed by changing one data sample according to the present approach.

FIG. 16 is a graph of the number of nodes in a round robin FFT that are changed by changing one data sample according to the present approach. As expected from the equation above, as the FFT gets longer, the percentage of nodes that are changed as a result of a single input sample change decreases at a slow exponential rate.

This means that the round robin FFT could consume less than 20% of the power of a non-round robin FFT in principle. In practice, in a digital application the control overhead to ensure that the computation exploits this redundancy probably exceeds the gain to be made. However, in an analog computer (or an event driven digital computing device) these savings in power are achievable, as a change of a single input sample affects only a small part of the analog circuit at a given time. One such analog computer for performing a FFT is shown in co-pending U.S. patent application Ser. No. 18/077,933, assigned to the assignee of the present application.

Figure 17:
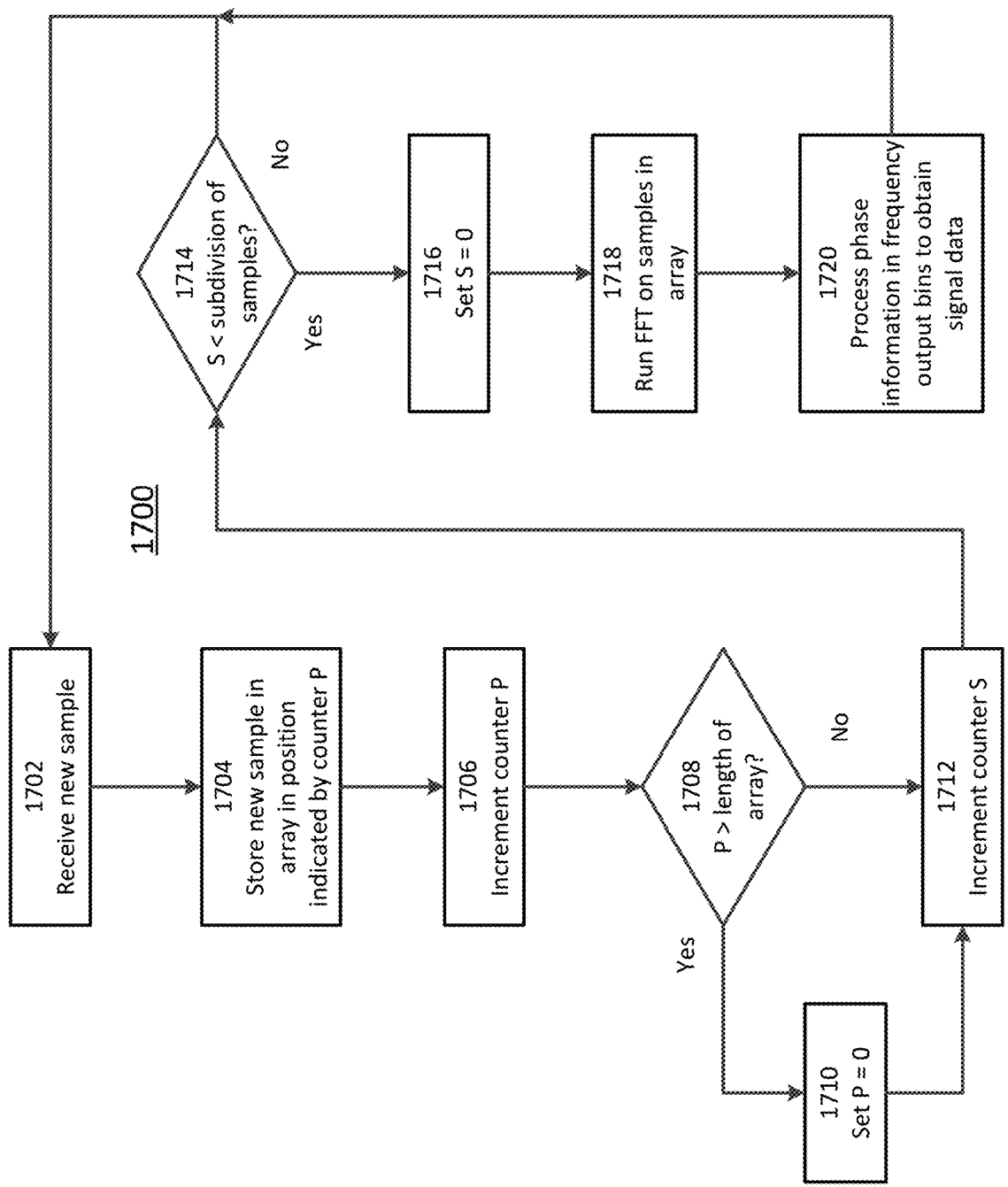
FIG. 17 is a flowchart of a method of operating a round robin FFT according to one embodiment of the present approach.

FIG. 17 is a flowchart of a method of operating a sequence of FFTs using a round robin approach according to one embodiment of the present approach. An array of a specific length, i.e., a number of samples of the input signal, is established; one of skill in the art will understand how to select an array of a length that will provide a desired number of output frequency bins. Each FFT is run after a predetermined number of new input samples is added to the array. As is known in the art, samples should be taken at a rate at least twice the highest carrier frequency as per the Nyquist sampling theorem.

At step 1702, a new sample is received, and at step 1704 the new sample is added to the array at a first position indicated by a counter P, where the value of counter P ranges over the length of the array. Typically, the first sample might be placed in a position indicated as 0, i.e., the first position in the array. At step 1706, the counter P is incremented, so that, for example, if the sample has been placed at a position indicated by 0 on counter P, counter P is incremented to 1.

At step 1708 it is determined whether the value of P is greater than the length of the array, i.e., all of the samples in the array have been entered or replaced. If P has exceeded the length of the array, at step 1710 P is reset to 0.

At step 1712, a counter S indicating how many new samples have been added to the array since the method started or since a last FFT was performed is incremented. At step 1714, it is determined whether the value of S is less than the predetermined number of new samples at which a next FFT is to be performed.

If S is less than the predetermined number of samples, then the time to perform an FFT has not been reached, so no FFT is performed and the method repeats steps 1702 to 1712; the method returns to step 1702 to obtain another new sample, which is then inserted in the array at the new position indicated by counter P. If at step 1714 the predetermined number of samples has been reached, at step 1716 the value of counter S is reset to 0 to count the number of new samples obtained from that point on, and at step 1718 an FFT is run on the samples in the array. As above, the FFT results in a plurality of frequency output bins, each bin containing phase information of the real and complex parts of a different frequency component of the input signal.

At step 1720 the frequency output bins of the FFT are processed as described above, using the phases of the real and complex parts of the frequency components to determine the data from the input signal that should be present in each frequency bin excluding any spill over from other frequency bins. As described above, this processing may be in the form of another FFT, or in some embodiments may consist of low-pass filtering.

An FFT may be run as often as desired. If the predetermined number of new samples at which an FFT is to be run is set at one, then a FFT will be run every time there is a new sample. A digital implementation of this will be difficult, as it will require significant computing power to run the FFT that often, while an analog computer implementation may be feasible in some cases. At the other extreme, if the predetermined number of samples is the length of the array, then a FFT will be run every time the array is filled, as in the prior art, and the output will look similar to that of a conventional prior art, non-round robin, FFT. Any predetermined number of samples between 1 and the length of the array may be selected.

For example, in the example of voice recognition, again analysis of sound from 100 Hz to 500 Hz is needed. In the prior art, to have the lowest bin of a FFT output at 100 Hz for each cycle of the input will require the FFT to output new data every 10 ms (1/100 Hz). In practice, this causes too much bin spreading over the frequency bins around 100 Hz, so some techniques instead provide FFT outputs every 20 ms, allowing two cycles of the 100 Hz frequency in the input sample. However, experience shows improved accuracy if higher frequencies, for example, 280 Hz to 350 Hz, can be examined at a higher rate than the 100 Hz frequency can be examined. The rate of innovation at the higher frequencies may be lower, perhaps 8 ms rather than 10 ms. To capture this, the prior art might interleave three FFTs of 20 ms intervals each to obtain a FFT result every 6.7 ms.

By contrast, using the present approach, FFTs can be performed at a higher rate than in the prior art. The interleaving of FFTs using the present approach can allow the lowest frequency of interest to be captured while at the same time showing the evolution of the higher frequencies and allowing data at the faster time of innovation to be captured. As with conventional FFTs, it will be apparent to one of skill in the art how to select an appropriate sampling rate, length of array, and desired frequency outputs for a desired application.

Several advantages of the present approach will be apparent to one of skill in the art. In a conventional prior art digital FFT, filling an array of, for example, 256 samples by shifting all of the samples over as each new sample is entered will require 256 clock cycles. In the present approach, entering one new sample at a particular location without shifting the other samples takes 1 clock cycle.

Consider the latest standard of $5^{th}$ generation radio (5G), which is said to allow data rates up to 10 megahertz (MHz). The sample rate is over 2 gigasamples/second, and 4096 frequency bins are used, so the FFT array used is 4096 points. The rate of innovation is considered to be 5 MHz, so the low-pass filters must allow for that frequency to pass. The frequency bands are believed to have a separation of as little as 150 Hz, and some bands may not be used for data at all, but act as "guard bands" to provide more separation and reduce the spill over into the bands that actually carry data (while still requiring the higher sampling rate).

Because the round robin approach significantly reduces the effect of spill over and makes the frequency spreads much narrower than the prior art as above, 512 frequency bands should suffice to carry the same data rate. The round robin FFT can thus also be only 512 points, and can thus run faster than the conventional FFT of the prior art. Similar results will be apparent to one of skill in the art when the present approach is used with other applications.

The disclosed system has been explained above with reference to several embodiments. Other embodiments than the specific examples described herein will be apparent to those skilled in the art in light of this disclosure.

Certain aspects of the described method and apparatus may readily be implemented using configurations other than those described in the embodiments above, or in conjunction with elements other than or in addition to those described above. For example, as is well understood by those of skill in the art, the illustration of frequencies, cycles, sampling rates, length of FFT, etc., is exemplary; one of skill in the art will appreciate that other values may be used and will be able to select the appropriate set of parameters that is appropriate for a particular application.

These and other variations upon the embodiments are intended to be covered by the present disclosure, which is limited only by the appended claims.

APPENDIX A

Code for a Round Robin FFT

```
(with-FFT-arrays (in out 256)
  (loop
    for k below 3500
    with rg = (random-gauss 0 0 25m)
    with ave = (make-array 128 :initial-element 0.0)
    as rr = (mod k 256)
    as sig = (+ (funcall rg) (sin (* 10 2 pi (/ k 256))))
    do (setf (aref in (* 2 rr)) sig)
    when (> k 256)
    do
    (fft)
    (loop
      for i below 128
      as j = (if (= i 0) 128 (- 256 i))
      do (incf (aref ave i)
        (+
          (sqrt (+    (expt (aref out (+ 2 j)) 2)
                      (expt (aref out (1+ (* 2 j))) 2)))
          (sqrt (+    (expt (aref out (* 2 i)) 2)
                      (expt (aref out (1+ (* 2 i))) 2))))))
    and collect (aref out (* 2 10)) into y10i
```

```
    and collect (aref out (1+ ( * 2 10))) into y10q
    and when (zerop (mod k 32)) do
    (plot (list y10i y10q) (/ 8k) "Bin10"
          :contour-names '("10i" "10q")
          :grids '(1 1 2 2)
          :add-to-existing nil
          :key :right)
(plot ave 1 "fft" :y-keys :db :add-to-existing nil :form :drop-lines)
finally
(plot (list y10i y10q #+nil y13i #+nil y13q) (/ 8k) "FFT"
      :contour-names '("10i" "10q" #+nil "13i" #+nil "13q")
      :grids '(2 2 3 3)
      :add-to-existing t
      :key :right)))
```

APPENDIX B

Code for Interpreting FFT Output when an Analytic Signal is Applied

```
(with-FFT-arrays (in out 256)
  (loop
    repeat 1
    do
    (loop
      for i below 256
      as sig = (cis (* -100 2 pi (/ i 256)))
      do
      (setf (aref in (* 2 i)) (realpart sig))
      (setf (aref in (1+ (* 2 i))) (imagpart sig)))
    (fft)
    (let ( (out (loop for i below 256 collect
                  (complex (aref out (* 2 i)) (aref out (1+ (* 2 i)))))))
      (plot (append (subseq out 128) (subseq out 0 128))
            (loop for i from -128 below 128 collect i)
            "Analytic" :y-keys :db :add-to-existing nil))))
```

APPENDIX C

Code to Generate the Filtered Bins Output

```
(defun RRFFT (length)
  "Assuming complex input"
  (when
    (loop
      for i from 2 below 24
      thereis (= length (ash 1 i)))
    (let ((ptr -1)
          (hl (floor length 2)))
      (with-FFT-arrays (in out length)
        (flet ((rrfft (x)
                 (setq ptr (mod (1+ ptr) length))
                 (setf (aref in (* 2 ptr)) x)
                 (fft))
               (collect ( )
                 (loop
                   for i below hl
                   as j = (if (= i 0) hl (- length i))
                   collect
                   ( +
                     (sqrt (+  (expt (aref out (* 2 j)) 2)
                               (expt (aref out (1+ (* 2 j))) 2)))
                     (sqrt (+  (expt (aref out (* 2 i)) 2)
                               (expt (aref out (1+ (* 2 i))) 2))))))
          (values #'rrfft #'collect out in))))))
(defun test-sweep (&key (from 9) (to 15) (show-bin 13) (runtime 500m) (fftlen 256) (sample 1fs)
                        (filter 100) (filter-length (round (* 2.5 (/ sample filter)))) (new-plot nil))
  (format t "~%FFT ~d, Fsam ~u. Bin 1 ~u, BinN ~u"
          fftlen sample (/ sample fftlen) (* (/ sample fftlen) (floor fftlen 2)))
```

-continued

```
(loop
   with (rrfft collect out) = (multiple-value-list (RRFFT fftlen))
   with rftr = (if (and (numberp filter) (plusp filter))
                   (low-pass-fir-filter :length filter-length :f filter :fop sample) #'identity)
   with iftr = (if (and (numberp filter) (plusp filter))
                   (low-pass-fir-filter :length filter-length :f filter :fop sample) #'identity)
   with fsweep = (frequency-sweep
                   (* from (/ sample fftlen))
                   (* to (/ sample fftlen))
                   (/ sample) :form :lin
                   :total-number-of-points (round (* runtime sample)))
   for time below runtime by (/ sample)
   as r = (progn collect (funcall rrfft (funcall fsweep)) (aref out (* 2 show-bin)))
   as i = (aref out (1+ (* 2 show-bin)))
   as rf = (funcall rftr r)
   as if = (funcall iftr i)
   when (> time (* 2 (/ filter-length sample)))
   collect (/ (abs (complex rf if)) 128) into resp
   finally (plot resp (/ sample) "Response"
                   :contour-names (format nil "~u;~d" filter show-bin)
                   :add-to-existing (not new-plot)
                   :preserve-zoom nil
                   :y-keys :db)))
#+nil
(progn
  (test-sweep :filter 100 :show-bin 10 :new-plot t)
  (test-sweep :filter 100 :show-bin 11)
  (test-sweep :filter 100 :show-bin 12)
        (test-sweep :filter 100 :show-bin 13))
```

What is claimed is:

1. A computer-implemented method of performing a series of fast Fourier transforms (FFTs) on samples of an input signal, comprising:
   (a) receiving, by a processor, a new sample of the input signal;
   (b) storing, in a memory, by the processor, the new sample in an array at a position indicated by a counter P;
   (c) incrementing, by the processor, the counter P by 1;
   (d) resetting, by the processor, the counter P to 0 when the counter P exceeds a length of the array;
   (e) incrementing, by the processor, a counter S by 1, the counter S indicating how many new samples have been stored in the array;
   (f) determining, by the processor, whether the counter S is less than the predetermined number of new samples;
   (g) repeating steps (a) through (f) when it is determined that the counter S is less than the predetermined number of new samples;
   (h) resetting, by the processor, the counter S to 0;
   (i) running, by the processor, an FFT on the samples stored in the array, thereby generating a plurality of frequency output bins, each output bin containing phase information of real and complex parts of a different frequency component of the input signal; and
   (j) processing, by the processor, the phase information of the real and complex parts of each different frequency component of the input signal contained in the plurality of frequency output bins, whereby signal data in each of the plurality of frequency output bins is recovered; and
   (k) repeating steps (a) through (j) until a predetermined number of FFTs have been run.

2. The method of claim 1 wherein processing the phase information of the real and complex parts of each different frequency component of the input signal contained in the plurality of frequency output bins further comprises applying additional FFTs to the frequency components in the plurality of frequency output bins.

3. The method of claim 1 wherein processing the phase information of the real and complex parts of each different frequency component of the input signal contained in the plurality of frequency output bins further comprises applying low-pass filters to the frequency components in the plurality of frequency output bins.

4. A non-transitory computer readable storage medium having embodied thereon instructions for causing a computing device to execute a method of performing a series of fast Fourier transforms (FFTs) on samples of an input signal, the method comprising:
   (a) receiving a new sample of the input signal;
   (b) storing, in a memory, the new sample in an array at a position indicated by a counter P;
   (c) incrementing the counter P by 1;
   (d) resetting the counter P to 0 when the counter P exceeds a length of the array;
   (e) incrementing a counter S by 1, the counter S indicating how many new samples have been stored in the array;
   (f) determining whether the counter S is less than the predetermined number of new samples;
   (g) repeating steps (a) through (f) when it is determined that the counter S is less than the predetermined number of new samples;
   (h) resetting the counter S to 0;
   (i) running an FFT on the samples stored in the array, thereby generating a plurality of frequency output bins, each output bin containing phase information of real and complex parts of a different frequency component of the input signal; and
   (j) processing the phase information of the real and complex parts of each different frequency component of the input signal contained in the plurality of frequency output bins, whereby signal data in each of the plurality of frequency output bins is recovered; and
   (k) repeating steps (a) through (j) until a predetermined number of FFTs have been run.

5. The non-transitory computer readable storage medium of claim 4 wherein processing the phase information of the real and complex parts of each different frequency component of the input signal contained in the plurality of frequency output bins further comprises applying additional FFTs to the frequency components in the plurality of frequency output bins.

6. The non-transitory computer readable storage medium of claim 4 wherein processing the phase information of the real and complex parts of each different frequency component of the input signal contained in the plurality of frequency output bins further comprises applying low-pass filters to the frequency components in the plurality of frequency output bins.

* * * * *